(12) United States Patent
Iacovoni et al.

(10) Patent No.: US 11,444,352 B2
(45) Date of Patent: Sep. 13, 2022

(54) TRACTION BATTERY SECURING ASSEMBLY AND METHOD

(71) Applicant: Ford Global Technologies, LLC, Dearborn, MI (US)

(72) Inventors: Donald P. Iacovoni, Plymouth, MI (US); Paul L. Heirtzler, Jr., Northville, MI (US); Hassen Hammoud, Dearborn, MI (US); Randall Ray Roth, Brighton, MI (US); Brent Zapczynski, Garden City, MI (US); Michael E. Reibling, Sterling Heights, MI (US); Christian Johan Owen Handley, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 950 days.

(21) Appl. No.: 15/603,882

(22) Filed: May 24, 2017

(65) Prior Publication Data
US 2018/0342718 A1    Nov. 29, 2018

(51) Int. Cl.
*H01M 50/20* (2021.01)
*B60K 1/04* (2019.01)
(Continued)

(52) U.S. Cl.
CPC .............. *H01M 50/20* (2021.01); *B60K 1/04* (2013.01); *B60L 50/64* (2019.02); *B60L 50/66* (2019.02);
(Continued)

(58) Field of Classification Search
CPC ............. H01M 2/1083; H01M 2/1077; H01M 2220/20; H01M 2/1022; H01M 2220/30; H01M 2/1066; H01M 2/1033; H01M 2/1016; H01M 10/42; H01M 2/1055; H01M 2/30; H01M 2/10; H01M 10/6235; H01M 2/0217; H01M 10/441; H01M 10/482; H01M 2/1094; H01M 2/34; H01M 2/0212; H01M 10/0481; H01M 10/425;
(Continued)

(56) References Cited

U.S. PATENT DOCUMENTS

| 2,959,446 | A | | 11/1960 | Thompson |
| 5,301,765 | A | * | 4/1994 | Swanson .................. B60K 1/04 |
| | | | | 180/68.5 |

(Continued)

FOREIGN PATENT DOCUMENTS

JP    2012086584    *    5/2012    .............. B60K 1/04

OTHER PUBLICATIONS

Machine translation of JP 2012-086584, Motohashi et al., 2012 (Year: 2012).*
U.S. Appl. No. 15/440,325, filed Feb. 23, 2017.

*Primary Examiner* — Kwang Han
(74) *Attorney, Agent, or Firm* — David B. Kelley; Carlson, Gaskey & Olds, P.C.

(57) ABSTRACT

An exemplary traction battery assembly includes, among other things, a battery pack and a securing assembly. The securing assembly secures the battery pack to a structure of the vehicle. The securing assembly is disposed along a horizontally facing side of the battery pack and is configured to move from a first position to a second position in response to a load to permit movement of the battery pack relative to the vehicle structure.

20 Claims, 9 Drawing Sheets

(51) Int. Cl.
*B60L 50/64* (2019.01)
*B60L 50/60* (2019.01)
*B62D 21/15* (2006.01)

(52) U.S. Cl.
CPC .... *B62D 21/152* (2013.01); *B60K 2001/0416* (2013.01); *B60Y 2306/01* (2013.01); *H01M 2220/20* (2013.01)

(58) Field of Classification Search
CPC .. H01M 10/65; H01M 10/655; H01M 2/0245; H01M 2/04; H01M 2/0404; H01M 2/043; H01M 2/0473; H01M 2/1027; H01M 2/206; H01M 2/342; H01M 2220/10; H01M 10/4257; H01M 10/46; H01M 10/613; H01M 10/625; H01M 10/6556; H01M 10/6567; H01M 10/6568; H01M 2/1072; B60K 1/04; B60K 2001/0416; B60L 11/1879; B60L 11/1877; B60Y 2306/01; B25F 5/02; B25F 5/00; B25F 5/006

See application file for complete search history.

(56) References Cited

U.S. PATENT DOCUMENTS

| | | | |
|---|---|---|---|
| 5,555,950 A | 9/1996 | Harada et al. | |
| 5,760,569 A * | 6/1998 | Chase, Jr. | B60K 1/04 104/34 |
| 6,938,553 B2 * | 9/2005 | Tamaki | B61C 17/06 104/34 |
| 8,051,934 B2 | 11/2011 | Kiya et al. | |
| 9,139,074 B2 | 9/2015 | Jarocki | |
| 2009/0079145 A1 * | 3/2009 | Inoue | B60G 15/063 280/5.515 |
| 2010/0147604 A1 * | 6/2010 | Sakita | B60K 1/04 180/65.1 |
| 2011/0011654 A1 * | 1/2011 | Kubota | B60K 1/04 180/65.21 |
| 2015/0270514 A1 * | 9/2015 | Baek | H01M 2/1061 429/151 |
| 2017/0080805 A1 * | 3/2017 | Lim | B60L 3/0007 |

* cited by examiner

TRACTION BATTERY SECURING ASSEMBLY AND METHOD

TECHNICAL FIELD

This disclosure relates generally to securing assemblies used in connection with a traction battery and, more particularly, to securing assemblies that keep the traction battery connected to the vehicle structure and shielded from loads during, for example, an impact event.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery can be a relatively high-voltage traction battery that selectively powers the electric machines and other electrical loads of the electrified vehicle. The traction battery can be packaged, for example, within a trunk compartment of the electrified vehicle.

SUMMARY

A traction battery assembly according to an exemplary aspect of the present disclosure includes, among other things, a battery pack of a vehicle, and a securing assembly that secures the battery pack to a structure of the vehicle. The securing assembly is disposed along a horizontally facing side of the battery pack and is configured to move from a first position to a second position in response to a load to permit movement of the battery pack relative to the vehicle structure.

In a further non-limiting embodiment of the foregoing assembly, the securing assembly includes a rail and a groove slideably retained by the rail. The rail and the groove slide relative to each other when the securing assembly moves from the first to the second position.

In a further non-limiting embodiment of any of the foregoing assemblies, the battery pack has a plurality of sides extending vertically from a top of the battery pack to a bottom of the battery pack. One of the first or the grooves is provided by one of the plurality of sides. The other of the first of the grooves is secured directly to the vehicle structure.

A further non-limiting embodiment of any of the foregoing assemblies includes a damper that damps movement of the groove relative to the rail.

In a further non-limiting embodiment of any of the foregoing assemblies, the securing assembly comprises a slider bracket and a pin. The pin slides relative to the slider bracket within an aperture of the slider bracket when the securing assembly moves from the first to the second position.

In a further non-limiting embodiment of any of the foregoing assemblies, the battery pack has a plurality of sides extending vertically from a top of the battery pack to a bottom of the battery pack. One of the slider bracket or the pin is secured directly to one of the plurality of sides. The other of the slider bracket or the pin is secured directly to the vehicle structure.

In a further non-limiting embodiment of any of the foregoing assemblies, the securing assembly comprises a swing arm pivotably secured to the battery pack at a first pivot and pivotably secured to the vehicle structure at a second pivot. The swing arm pivots relative to the battery pack and the vehicle structure when the securing assembly moves from the first to the second position.

In a further non-limiting embodiment of any of the foregoing assemblies, the battery pack has a plurality of sides extending vertically from a top of the battery pack to a bottom of the battery pack. The first pivot extends directly from one of the plurality of sides. The second pivot extends directly from the vehicle structure.

A further non-limiting embodiment of any of the foregoing assemblies includes a wedge configured to move the battery pack vertically away from a surface of the vehicle in response to an impact load applied to a rear of the vehicle.

In a further non-limiting embodiment of any of the foregoing assemblies, the first pivot and the second pivot are aligned along horizontally extending pivot axes.

In a further non-limiting embodiment of any of the foregoing securing assemblies, the securing assembly comprises a plurality of brackets supporting the battery pack in a position spaced vertically from a trunk floor of a vehicle.

In a further non-limiting embodiment of any of the foregoing assemblies, each of the plurality of brackets is configured to move from a less elongated position to a more elongated position in response to an impact load applied to a rear of the vehicle to permit movement of the battery pack relative to the vehicle structure.

In a further non-limiting embodiment of any of the foregoing assemblies, each of the plurality of brackets includes a first section secured to the vehicle structure, a second section secured to the horizontally facing side of the battery pack, and a third section extending from the first to the second section. The first and second sections are closer together when the respective bracket is in the less elongated position than when in the more elongated position.

In a further non-limiting embodiment of any of the foregoing assemblies, the load is applied in a load direction along a longitudinal axis of a vehicle. The bracket is elongated in the load direction when moved from the less elongated position to the more elongated position.

In a further non-limiting embodiment of any of the foregoing assemblies, the battery pack has a plurality of sides extending vertically from a top of the battery pack to a bottom of the battery pack. The securing assembly is secured to the one of the plurality of sides that is closest to a front wheel of the vehicle.

In a further non-limiting embodiment of any of the foregoing assemblies, the battery pack is disposed above a trunk floor of the vehicle.

A traction battery securing method according to another exemplary aspect of the present disclosure includes transitioning a securing assembly from a first position to a second position in response to a load to permit movement of a battery pack within a trunk compartment relative to a vehicle structure. The securing assembly secures a horizontally facing side of the battery pack to a structure of the vehicle.

In a further non-limiting embodiment of the foregoing securing method, the securing assembly includes a rail and a groove slideably retained by the rail. The transitioning comprises sliding the groove relative to the rail when the securing assembly moves from the first to the second position.

In a further non-limiting embodiment of the foregoing securing methods, the securing assembly includes a swing arm pivotably secured to the battery pack at a first pivot and pivotably secured to the vehicle structure at a second pivot. The transitioning includes pivoting the swing arm relative to the battery pack and the vehicle structure when the securing assembly moves from the first to the second position.

In a further non-limiting embodiment of any of the foregoing securing methods, the securing assembly comprises a plurality of brackets supporting the battery pack in a position spaced vertically from a trunk floor of a vehicle. The transitioning includes moving each of the plurality of brackets from a less elongated position to a more elongated position in response to an impact load applied to a rear of the vehicle to permit movement of the battery pack relative to the vehicle structure.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a securing assembly that secures a traction battery within an electrified vehicle. The securing assembly incorporates features that help keep the traction battery connected to a structure of the electrified vehicle when a force is applied to the electrified vehicle, such as a force resulting from an impact event.

Figure 1:
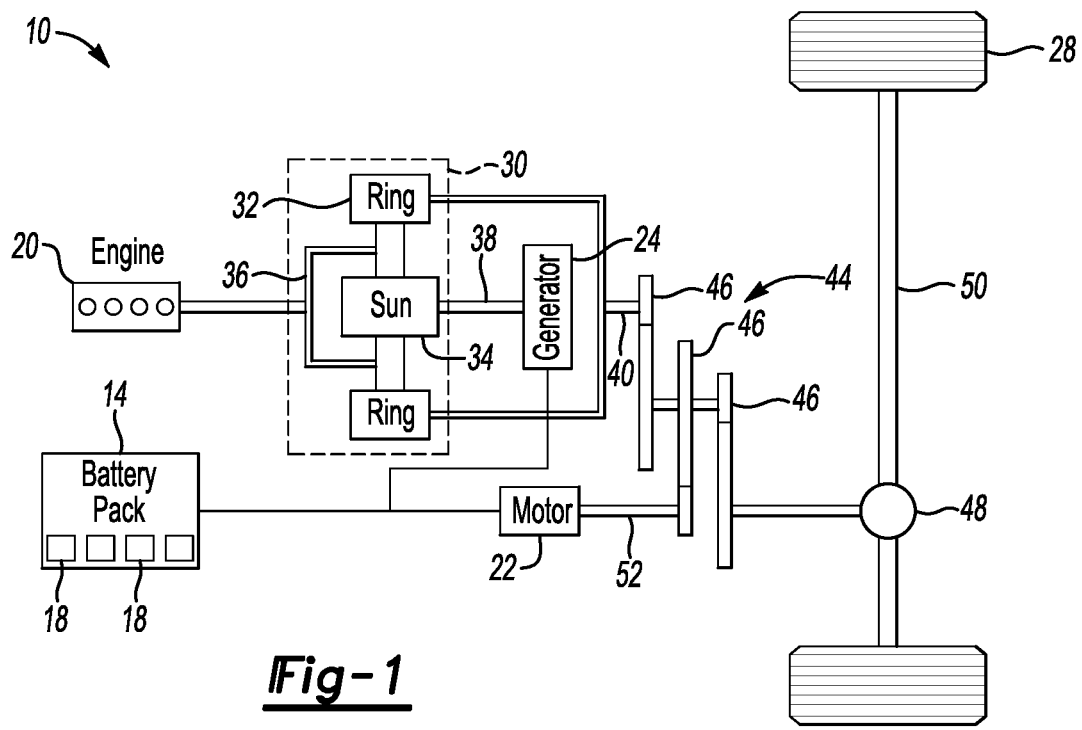
FIG. 1 illustrates a schematic view of an example powertrain for an electrified vehicle.
Figure 2:
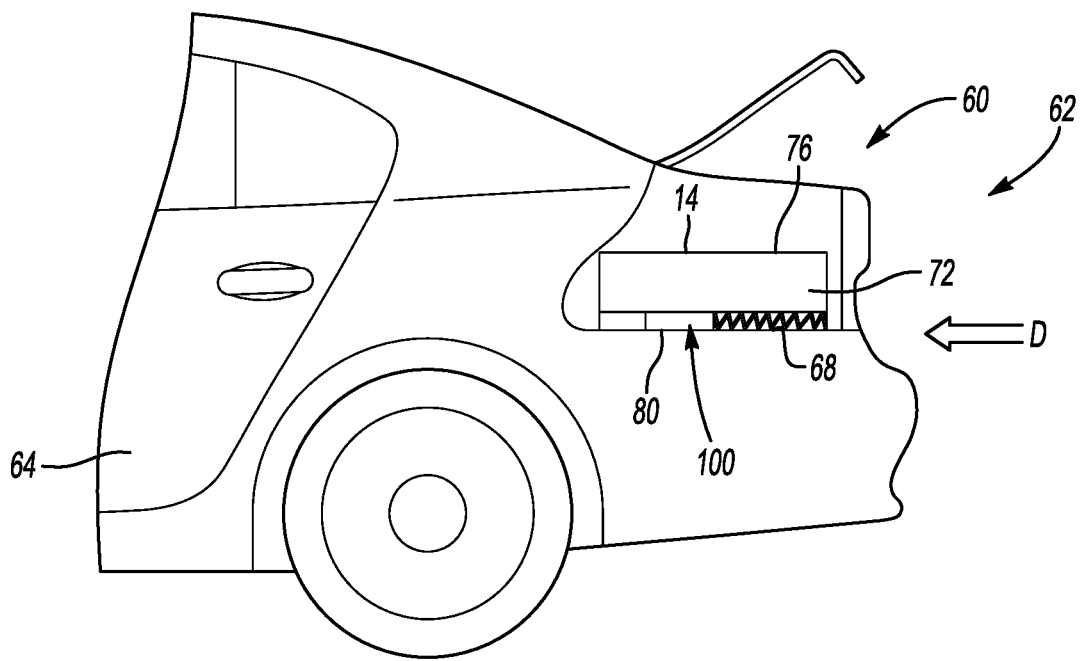
FIG. 2 illustrates a rear portion of an electrified vehicle with selected areas removed to reveal a traction battery of the FIG. 1 powertrain secured with within a trunk compartment of the electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 18, an internal combustion engine 20, a motor 22, and a generator 24. The battery pack 14 provides a traction battery. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Referring now to FIGS. 2-7, the battery pack 14 in an exemplary non-limiting embodiment is positioned within a trunk compartment 60 at a rear 62 of an electrified vehicle 64. A traction battery securing assembly 100 according to an exemplary embodiment of the present disclosure is used to secure the battery pack 14 within the trunk compartment 60.

In other examples, the battery pack 14 is secured in another area of the electrified vehicle 64, such as mounted in a back seat area, mounted under the rear of the electrified vehicle 64, or mounted beneath the center of the electrified vehicle 64

The battery pack 14 can be a relatively small or medium sized traction battery, such as traction battery used within a mild hybrid electric vehicle (MHEV) or a full hybrid electric vehicle (FHEV). The battery pack 14 could instead be a relatively large sized traction battery, such as the traction battery used within a plug-in hybrid electric vehicles (PHEV), or even the traction battery used within a battery electric vehicle (BEV). That is, the same type of traction battery securing assembly 100 can be scaled and adjusted and then used to secure traction batteries of various types and sizes.

The traction battery securing assembly 100 secures the battery pack 14 above the trunk floor 68 of the electrified vehicle 64. The traction battery securing assembly 100 is disposed along a horizontally facing side 72 of the battery pack 14 (see FIG. 7). Another traction battery securing assembly 100' is disposed along another horizontally facing side 72 of the battery pack 14. Generally, the horizontally facing sides 72 are aligned along planes that are perpendicular to a ground surface.

The horizontally facing sides 72 extend generally between a vertical top 76 and a vertical bottom 80 of the battery pack 14. Generally, the vertical top 76 and the vertical bottom 80 of the battery pack 14 are aligned along planes that are parallel to the ground surface.

The horizontally facing sides 72 include, in this example, two opposing sides facing laterally toward the lateral sides of the electrified vehicle 64, and two opposing horizontally facing sides facing the front of the electrified vehicle 64 and the rear of the electrified vehicle 64, respectively.

Figure 3:
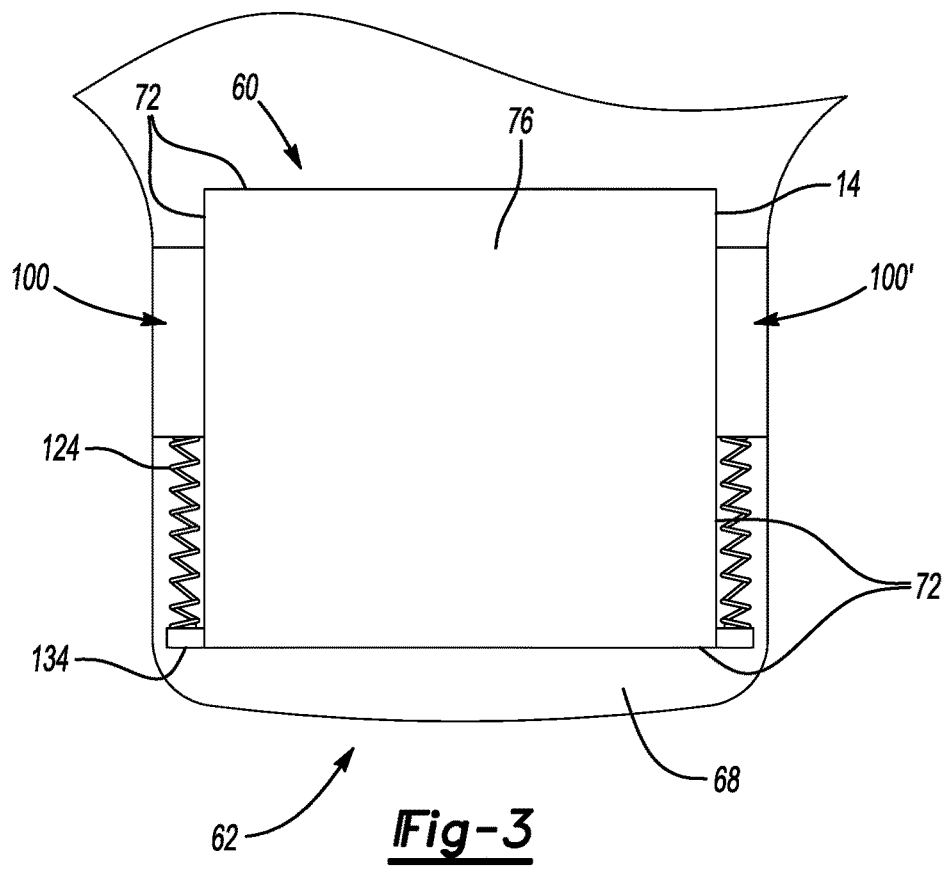
FIG. 3 illustrates a top view of the traction battery secured within the trunk compartment of FIG. 2 using a securing assembly.
Figure 4:
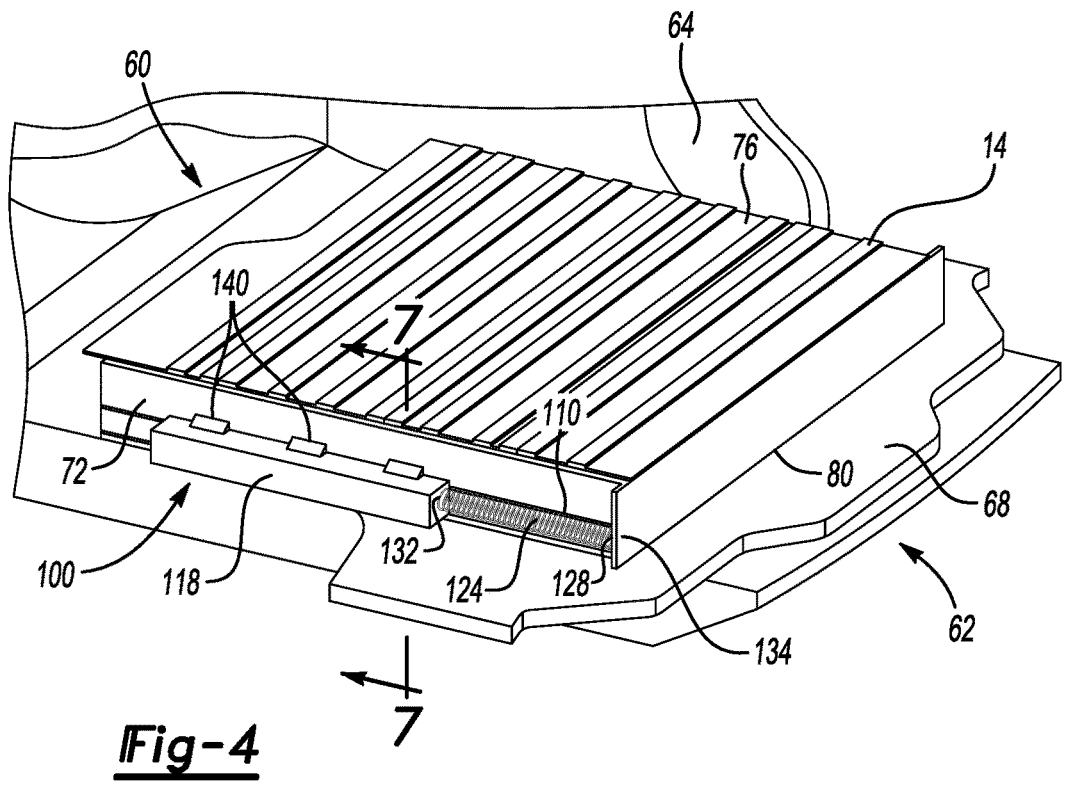
FIG. 4 illustrates a perspective view of the trunk compartment with selected portions cut away to show the traction battery and a portion of the securing assembly in the position of FIG. 3.
Figure 5:
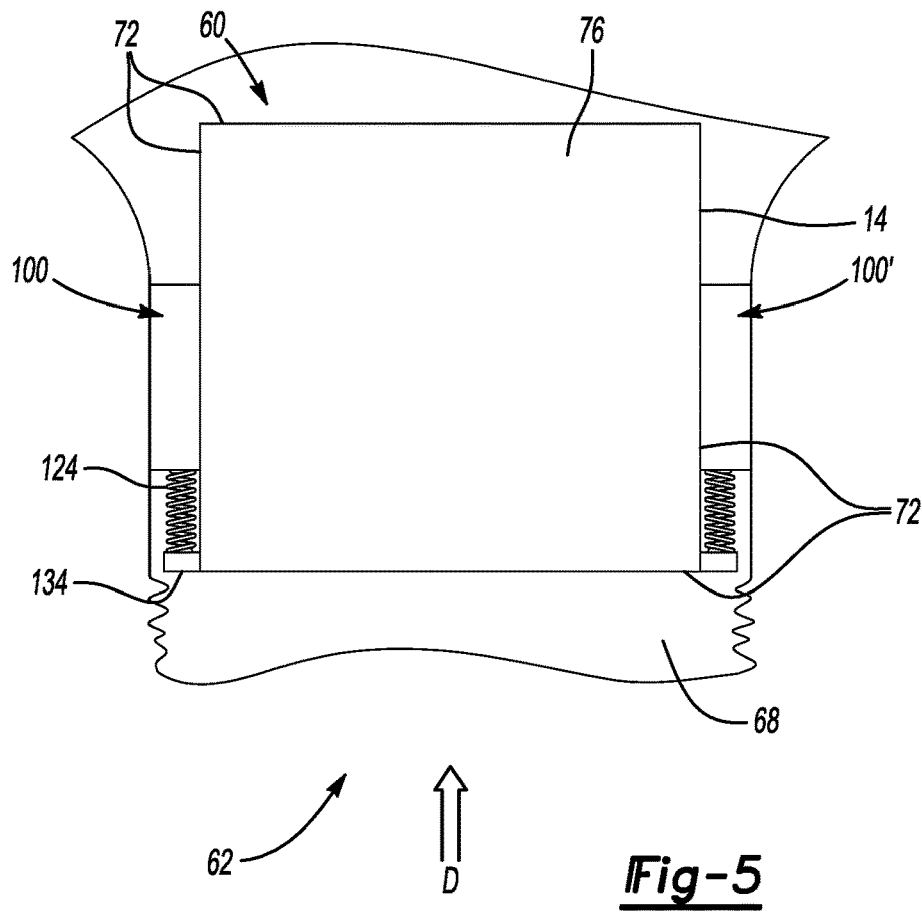
FIG. 5 illustrates the top view of FIG. 3 after an impact event.
Figure 6:
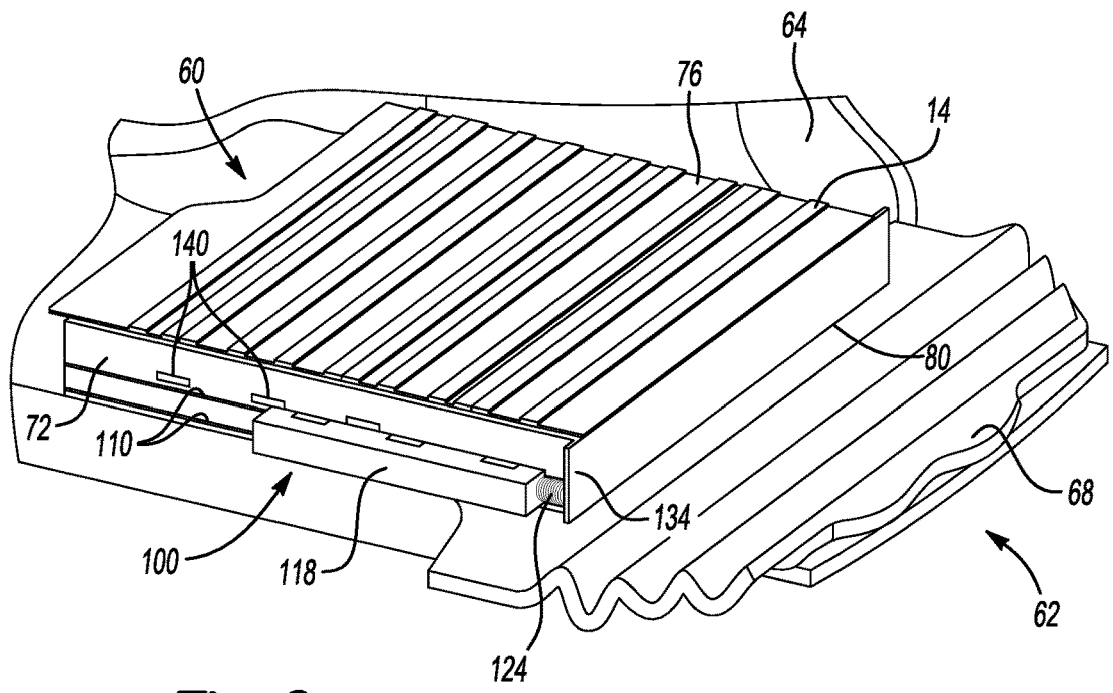
FIG. 6 illustrates the perspective view of FIG. 4 after the impact event.
Figure 7:
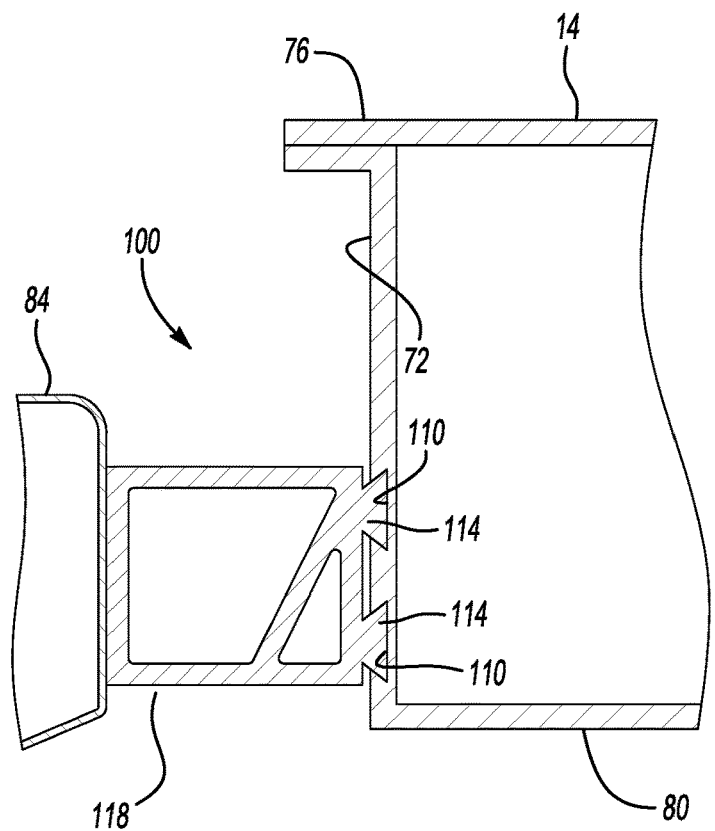
FIG. 7 illustrates a section view taken along line 7-7 in FIG. 4.

The traction battery securing assembly 100 is configured to move from the first position of FIGS. 3 and 4 to the second position of FIGS. 5 and 6 in response to an impact load, such as an impact load applied in a direction D to the rear 62 of the electrified vehicle 64. Loads along the direction D are along a longitudinal axis of the electrified vehicle 64, which extends from front wheels to rear wheels of the vehicle.

In other examples, the traction battery securing assembly 100 is rearranged such that the traction battery securing assembly 100 is configured to move from the first position to the second position in response to an impact load applied in another direction. For example, the traction battery securing assembly 100 could secure the battery pack 14 beneath a floor of the electrified vehicle 64 (outside the trunk compartment 60) and move from the first position to the second position in response to an impact load applied to a side of the electrified vehicle 64 in a direction perpendicular to the direction D.

The traction battery securing assembly 100 includes, in this example, a pair of grooves 110 and a pair of rails 114 (or tabs). Each of the grooves 110 slideably receives one of the rails 114 such that the rails 114 each interlock within one of the grooves 110. Although two grooves 110 and two rails 114 are used in this example. Other examples could include more than two or less than two grooves 110 and rails 114.

The example grooves 110 are slots formed directly within the horizontally facing side 72 of the battery pack 14. The grooves 110 and the rails 114 have a dovetail cross-section in this example, which facilitates maintaining cross-vehicle alignment of the grooves 110 and the rails 114. The horizontally facing side 72 is extruded with the grooves 110 in some examples.

The rails 114 extend from a frame 118 that is secured directly to a vehicle structure 84, such as a side rail of the electrified vehicle 64. The frame 118 can be bolted to the vehicle structure 84. In some examples, the frame 118 is extruded with the rails 114.

The exemplary grooves 110 are provided by the respective horizontally facing side 72 of the battery pack 14. In other examples, however, one or more grooves is provided by the frame 118, and one or more of the rails is provided by the horizontally facing side 72.

When a sufficient load is applied in the direction D to the rear 62 of the electrified vehicle 64, the battery pack 14 slides forward relative to the trunk floor 68 and the frame 118. This relative movement of the battery pack 14, among other things, lengthens a time a load is applied to the battery pack 14, which can desirably reduce a peak load imparted to the battery pack 14. Further, the securing assembly 100 helps keep the battery pack 14 secured to the vehicle structure 84 through throughout the impact event.

In this exemplary embodiment, the traction battery securing assembly 100 additionally includes a damper assembly 124. The damper assembly 124 includes a spring in this example extending from a first end portion 128 to a second end portion 132. The first end portion 128 is secured to a stop 134 of the battery pack 14, and the second end portion 132 is secured to the frame 118 of the securing assembly 100.

The spring is compressed as the battery pack 14 slides forward relative to the trunk floor 68 and the frame 118. That is, in FIGS. 3 and 4, the spring is less compressed than in the position of FIGS. 5 and 6. The compression of the spring as the battery pack 14 slides forward relative to the trunk floor 68 and the frame 118 can dampen movement of the battery pack 14, which can further reduce peak loads imparted to the battery pack 14.

Although the damper assembly 124 is described as a spring, other types of damper assemblies could be used, such as a fluid-based damper.

In some examples, the frame 118 is secured to the horizontally facing side 72 with one or more attachments 140, such as welds. The attachments 140 are designed to fracture in response to a load above threshold value. The attachments 140 limit movement of the rails 114 within the grooves 110 during operation of the electrified vehicle 64 prior to a sufficient load being applied in the direction D to the rear 62 of the electrified vehicle 64. The attachments 140 effectively prevent the battery pack 14 from moving during typical operation of the electrified vehicle 64, such as a hard stop during a drive cycle.

Figure 8:
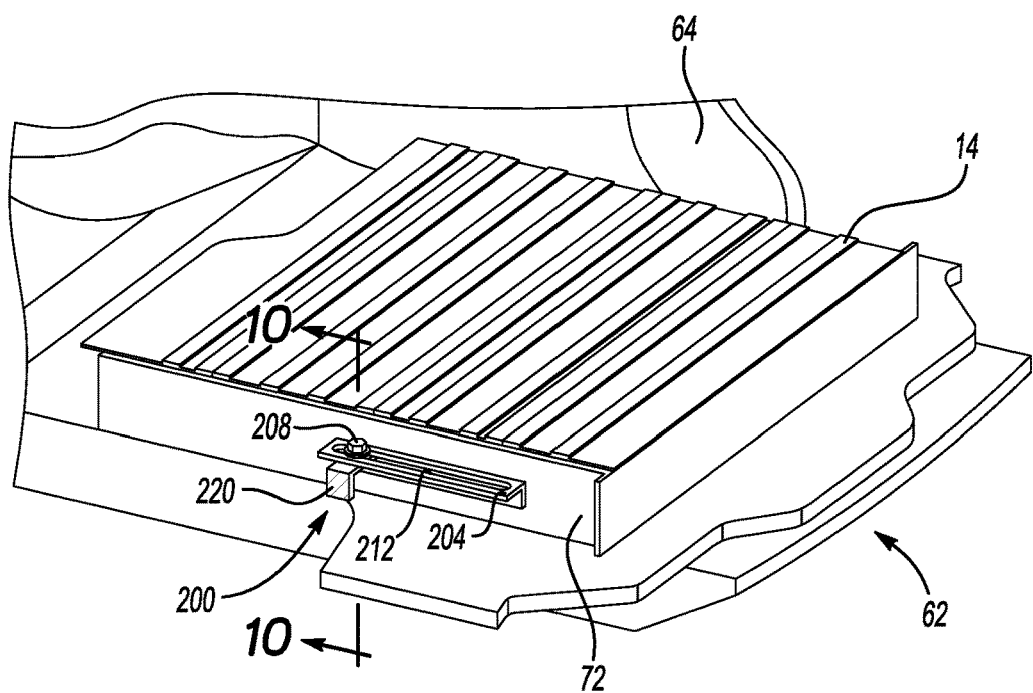
FIG. 8 illustrates a perspective view of a trunk compartment with selected portions cut away to show the traction battery and a portion of a securing assembly according to another exemplary embodiment.
Figure 9:
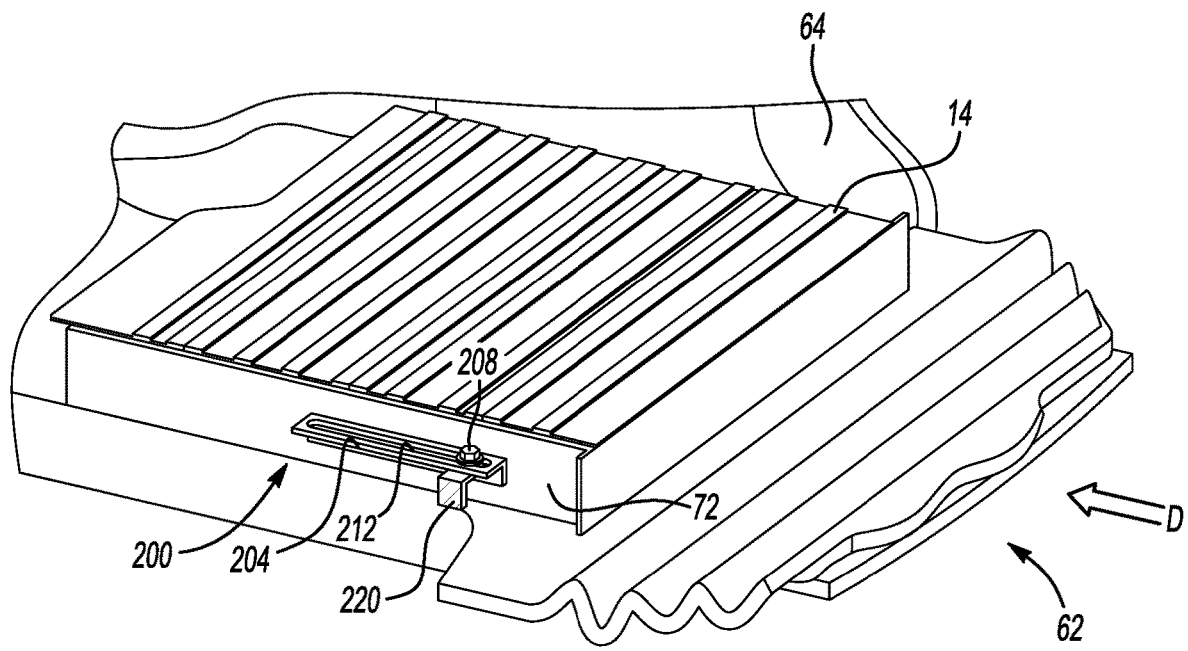
FIG. 9 illustrates the perspective view of FIG. 8 after an impact event.
Figure 10:
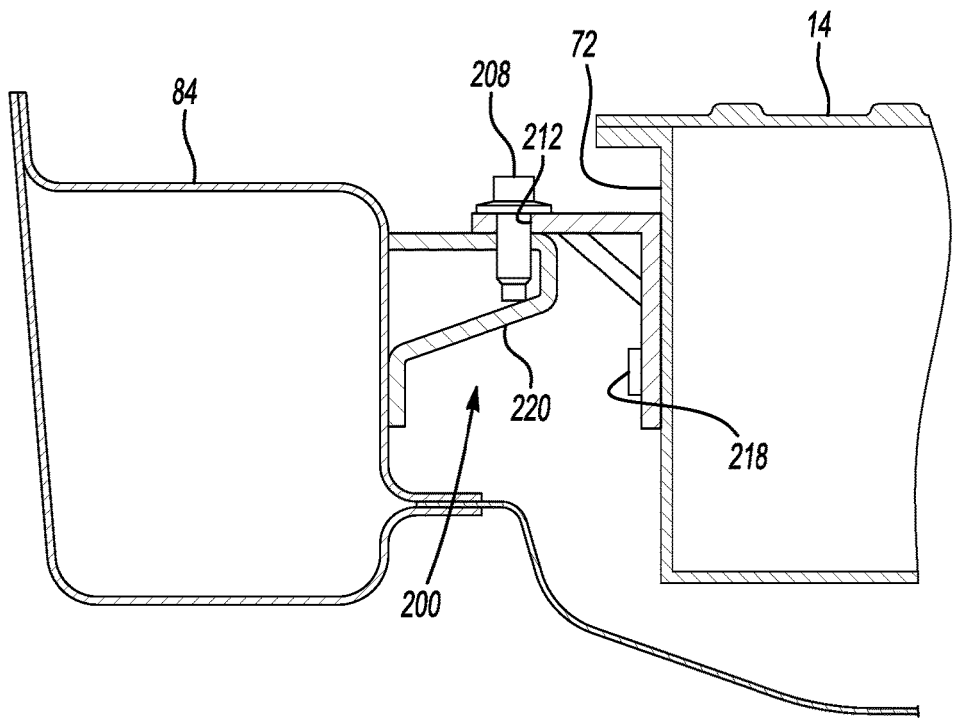
FIG. 10 illustrates a section view taken along line 10-10 in FIG. 8.

Referring now to FIGS. 8-10, a traction battery securing assembly 200 according to another exemplary non-limiting embodiment interfaces with one of the horizontally facing sides 72 of the battery pack 14 to secure the battery pack 14 to the vehicle structure 84. Another securing assembly 200 connects the opposing horizontally facing side of the battery pack 14 to the vehicle structure 84.

The traction battery securing assembly 200 includes a slider bracket 204 and a pin 208. In this example, the pin 208 is a threaded fastener, such as a bolt, that is received within an aperture 212 of the slider bracket 204.

The slider bracket 204 is secured directly to the horizontally facing side 72 of the battery pack 14 with threaded fasteners 218, for example. When a sufficient load is applied in the direction D to the rear 62 of the electrified vehicle 64, the battery pack 14 slides forward relative to the trunk floor 68 and the pin 208. The slider bracket 204 moves with the horizontally facing side 72 and the remaining portions of the battery pack 14 causing the pin 208 to be repositioned rearward within the aperture 212 from the position of FIG. 8 to the position of FIG. 9.

The pin 208 is secured directly to a pin bracket 220 fixed directly to the vehicle structure 84. This causes the pin 208 to effectively maintain its position as the slider bracket 204 moves forward relative to the electrified vehicle 64. The pin 208 could be secured to the pin bracket 220 via a weld nut, for example.

The example securing assembly 200 includes the slider bracket 204 with the aperture 212 secured directly to the battery pack 14, and the pin bracket 220 secured to the vehicle structure 84. This arrangement could be reversed in other examples, such that a slider bracket is secured to the vehicle structure 84, and a pin bracket is secured to the battery pack 14.

The traction battery securing assembly 200 permits movement of the battery pack 14 relative to the vehicle structure 84 while keeping the battery pack 14 secured to the vehicle structure 84. This lengthens the time that load is applied to the battery pack 14, which reduces the peak load experienced by the battery pack 14, while still retaining the battery pack 14.

Figure 11:
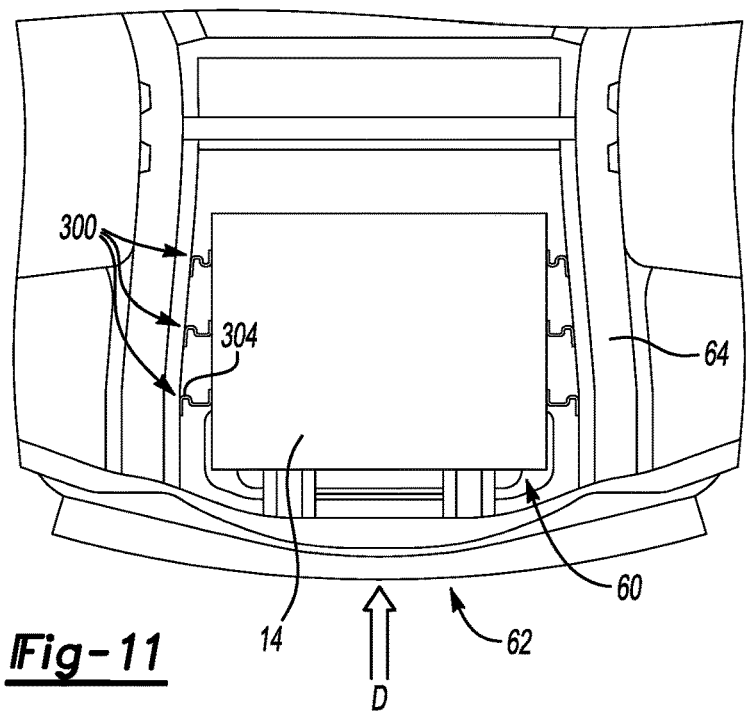
FIG. 11 illustrates a top view of the traction battery secured within a trunk compartment using a securing assembly according to yet another exemplary embodiment.
Figure 12:
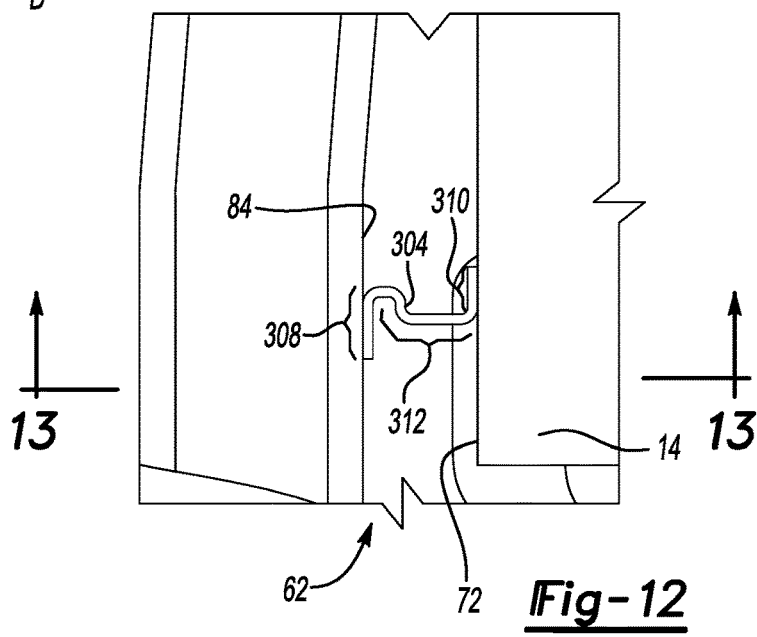
FIG. 12 illustrates a close-up, top view of a bracket from the securing assembly of FIG. 11.
Figure 13:
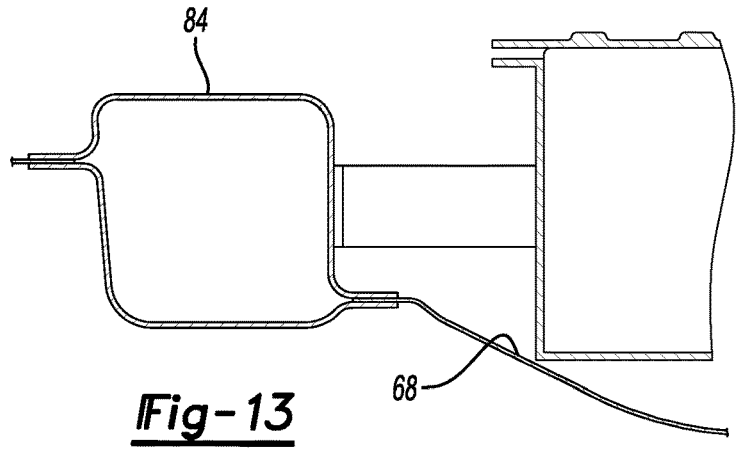
FIG. 13 illustrates a section view taken along line 13-13 in FIG. 12.

Referring now to FIGS. 11-13, a traction battery securing assembly 300 according to another exemplary non-limiting embodiment interfaces with one of the horizontally facing sides 72 of the battery pack 14 to secure the battery pack 14 to the vehicle structure 84. Another securing assembly connects the opposing horizontally facing side of the battery pack 14 to the vehicle structure 84.

The securing assembly 300 includes a plurality of brackets 304 that support the battery pack 14 in a position vertically spaced from the trunk floor 68 (see FIG. 13). In this example, the securing assembly 300 includes three brackets 304 secured to one of the horizontally facing sides 72. Other numbers of brackets 304 could be used, including more than three brackets 304 or less than three brackets 304. The brackets 304 are relatively stiff in a vertical direction to support the weight of the battery pack 14.

The brackets 304 each include a first section 308 secured directly to the vehicle structure 84, a second section 310 secured to the horizontally facing side 72 of the battery pack 14, and a third section 312 extending from the first section 308 to the second section 310.

Figure 14:
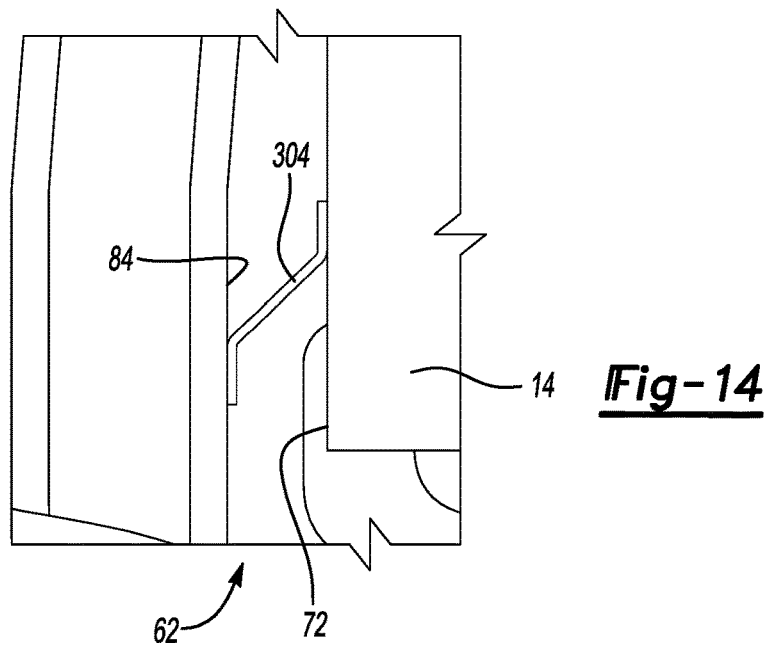
FIG. 14 illustrates the close-up, top view of the bracket of FIG. 12 after an impact event.

When a sufficient load is applied in the direction D to the rear 62 of the electrified vehicle 64, the brackets 304 of the securing assembly 300 elongate from the less elongated position of FIG. 12 to the more elongated position of FIG. 14. In the less elongated position, the respective first sections 308 and second sections 310 are closer together than when the brackets 304 is in the elongated position of FIG. 14.

The elongation of the brackets 304 permits the battery pack 14 to slide forward relative to the trunk floor 68 and the vehicle structure 84 while keeping the battery pack 14 secured to the vehicle structure 84. This relative movement of the battery pack 14, among other things, lengthens a time a load is applied to the battery pack 14, which can desirably reduce a peak load imparted to the battery pack 14.

In some examples, one or more of the brackets 304 of the securing assembly 300 that are further from the rear 62 of the electrified vehicle 64 could be intentionally designed to have a longer amount of "stroke" or elongation in response to a load applied to the rear 62 in the direction D. This approach can permit the battery pack 14 to potentially travel further away in response to the load applied to the rear 62 in the direction D even when the shorter bracket 304 or brackets 304 closer to the rear 62 have fully extended themselves and have separated from the vehicle structure 84.

The brackets 304 further from the rear 62 could be secured using relatively large mechanical fasteners (e.g., an M10 threaded fastener) to ensure the battery pack 14 remains retained to the vehicle structure 84 throughout application of the load in the direction D even when the brackets 304 have absorbed energy beyond their limit.

Brackets 304 closer to the rear 62 could be secured using relatively small fasteners (e.g., an M8 threaded fastener). These brackets 304 would then be more likely to separate from the vehicle structure 84 than the brackets 304 further from the rear 62.

Figure 15:
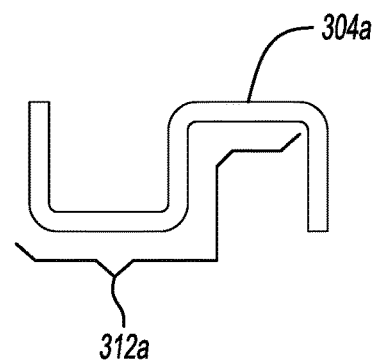
FIG. 15 illustrates another exemplary bracket for use in the securing assembly of FIG. 11.
Figure 16:
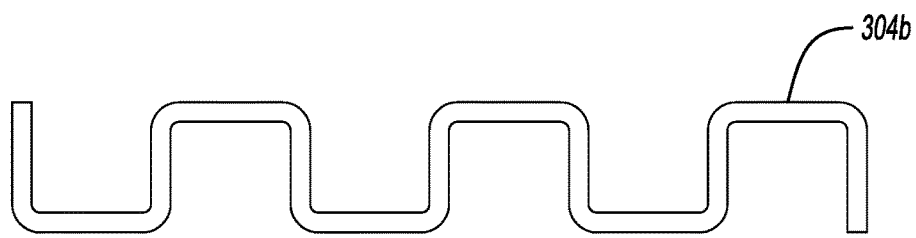
FIG. 16 illustrates yet another exemplary bracket for use in the securing assembly of FIG. 11.

Referring to FIG. 15, another exemplary bracket 304*a* for use in the securing assembly 300 of FIG. 11 could include two distinct curved areas within a third section 312*a*, rather than a single curved area.

Yet another exemplary bracket 304B for use within the traction battery securing assembly 300 of FIG. 11 includes more than two curved areas.

Figure 17:
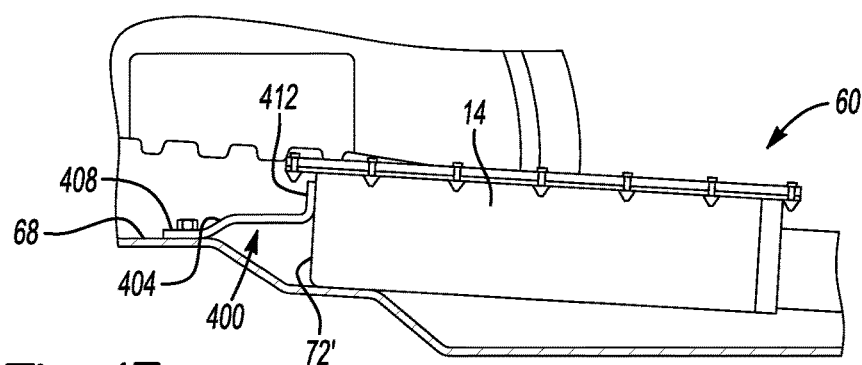
FIG. 17 illustrates a side view of a trunk compartment with selected portions cut away to show the traction battery and a portion of a securing assembly according to still another exemplary embodiment.
Figure 18:
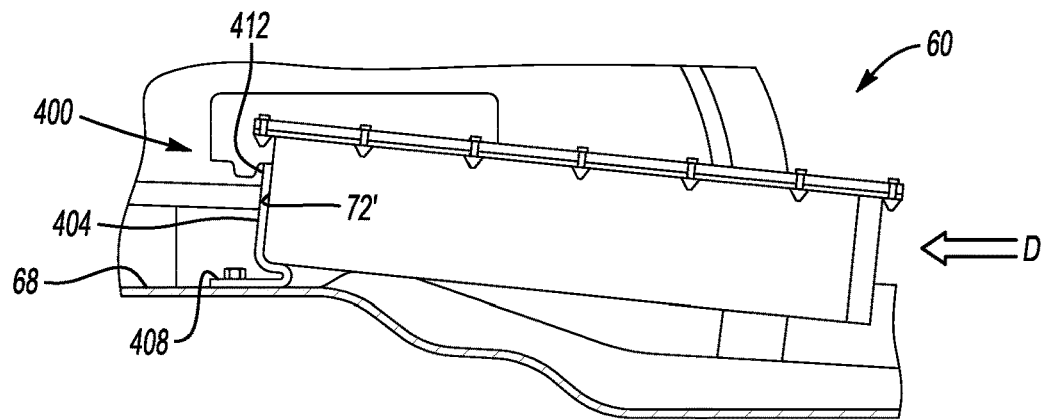
FIG. 18 illustrates the securing assembly of FIG. 17 after an impact event.

Referring now to FIGS. 17 and 18, a traction battery securing assembly 400 according to another exemplary non-limiting embodiment is along the horizontally facing side 72' that faces forward within the electrified vehicle 64. That is, the horizontally facing side 72' of the battery pack 14 faces toward the front wheels of the electrified vehicle 64.

The traction battery securing assembly 400 comprises a bracket 404 having a first end portion 408 secured to the trunk floor 68 of the trunk compartment 60. A second end portion 412 of the bracket 404 is secured to the horizontally facing side 72' of the battery pack 14.

In this example, the first end portion 408 is secured to the trunk floor 68 with a mechanical fastener, but other methods of attachment could be utilized including, for example, welding the first end portion 408 to the trunk floor 68.

In this example, the second end portion 412 is secured to the horizontally facing side 72' by welding. In other examples, other methods of attachment could be used including, for example, bolting the second end portion 412 to the horizontally facing side 72'.

In response to an impact event, the bracket 404 folds from the position of FIG. 17 to the position of FIG. 18. The securing assembly 400 thus permits movement of the battery pack 14 relative to the vehicle structure 84 while keeping the battery pack 14 secured to the vehicle structure 84. This lengthens the time that load is applied to the battery pack 14, which reduces the peak load experienced by the battery pack 14, while still retaining the battery pack 14.

Referring now to FIGS. 19-23, a traction battery securing assembly 500 according to another exemplary non-limiting embodiment comprises a plurality of swing arms 504 securing a horizontally facing side 72 of the battery pack 14 to a vehicle structure 84. In this example, the securing assembly 500 includes two swing arms 504 secured to the horizontally facing side 72. Another securing assembly 500 includes swing arms 504 securing to an opposing horizontally facing side 72.

Each of the swing arms 504 includes a first end portion 508 pivotably secured to a swing arm bracket 510 through a first pivot 512. The swing arm bracket 510 is claw shaped and is secured directly to horizontally facing side 72 of the battery pack 14 via a weld, for example. Each of the swing arms 504 further includes a second end portion 516 pivotably secured to the vehicle structure 84 at a second pivot 520. Pins could provide the first pivot 512 and the second pivot 520. The pin providing the first pivot 512 holds the swing arm bracket 510 relative to the first end portion 508 while permitting pivoting movement of the swing arm bracket 510 relative to swing arm 504. The first pivot 512 and the second pivot 520 are configured to pivot about horizontally extending pivot axes that are perpendicular to the longitudinal axis of the electrified vehicle 64.

Figure 19:
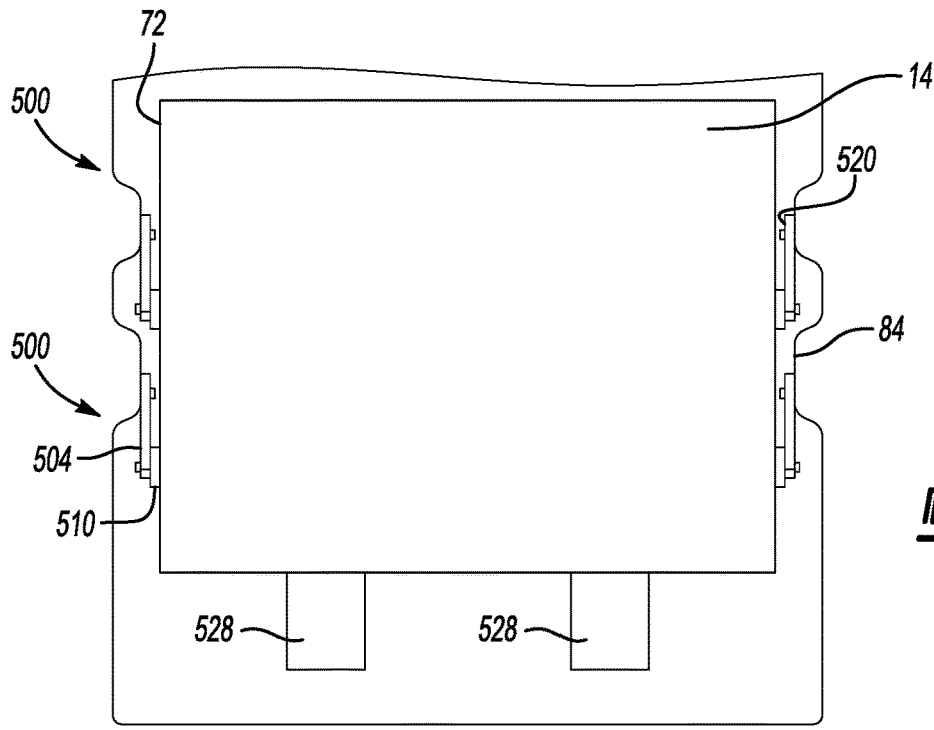
FIG. 19 illustrates a top view of a trunk compartment with the traction battery and a portion of a securing assembly according to still another exemplary embodiment.
Figure 20:
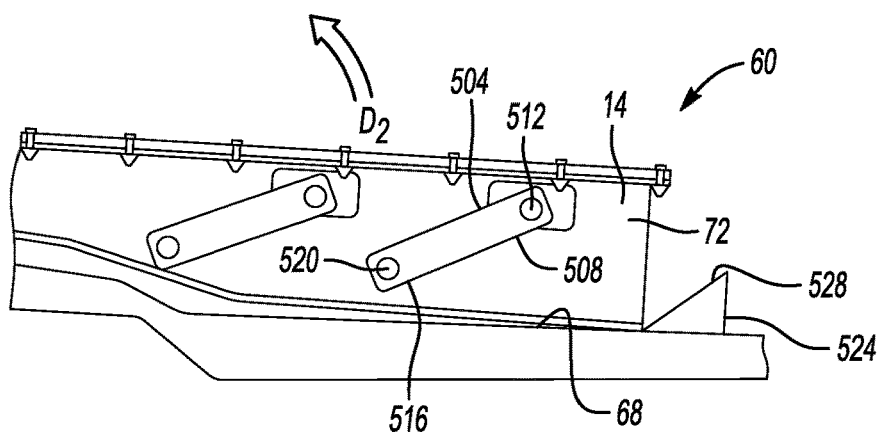
FIG. 20 illustrates a side view of the trunk compartment with selected portions cut away to show the traction battery and a portion of the securing assembly in the position of FIG. 19.
Figure 21:
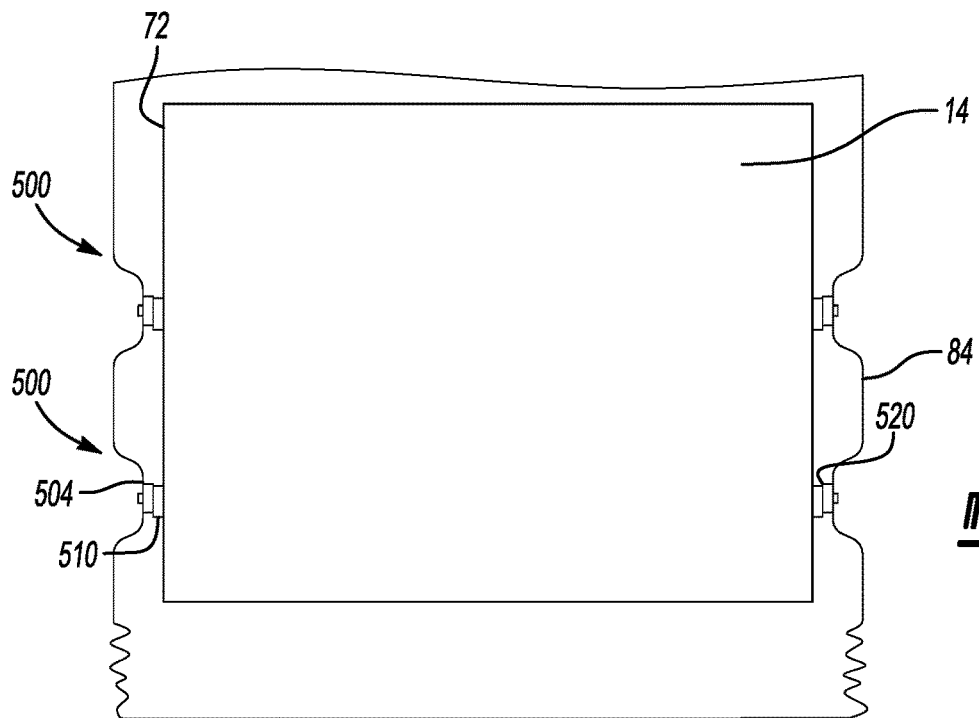
FIG. 21 illustrates a top view of a trunk compartment with the traction battery and a portion of the securing assembly of FIG. 20 after an impact event.
Figure 22:
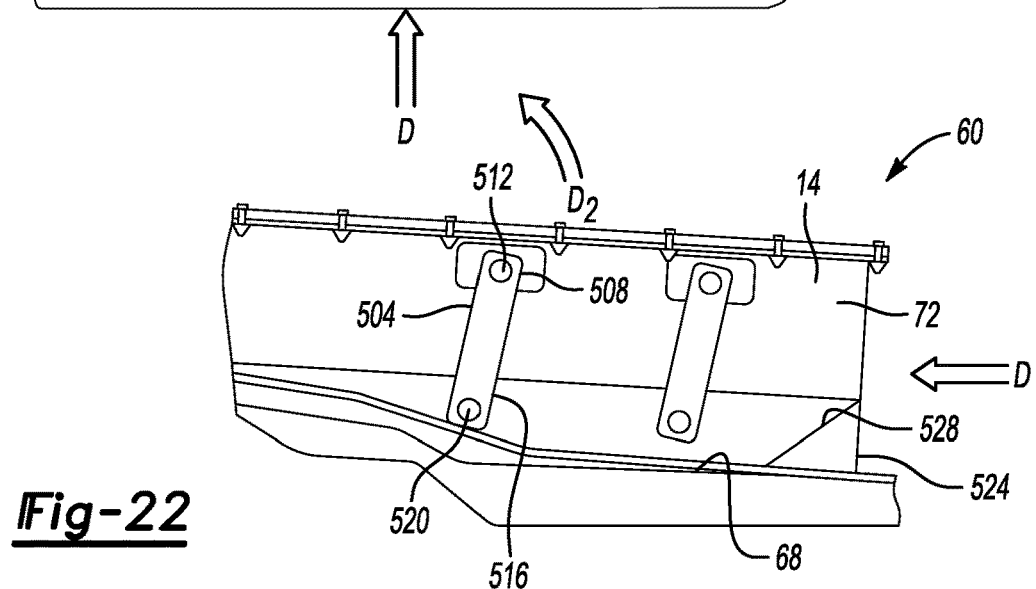
FIG. 22 illustrates a side view of the trunk compartment with selected portions cut away to show the traction battery and a portion of the securing assembly in the position of FIG. 21.
Figure 23:
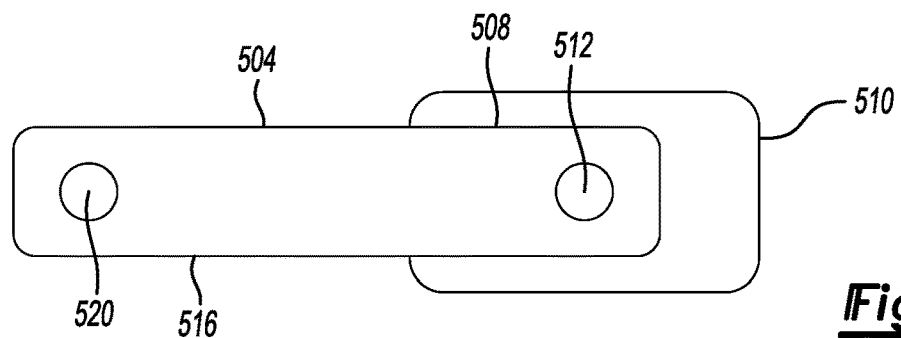
FIG. 23 shows a close-up, side view of one of a pivoting assembly from the securing assembly of FIG. 19.

In response to an impact load applied along the direction D, the battery pack 14 moves in a direction $D_2$ from the position of FIGS. 19 and 20 to the position of FIGS. 21 and 22. The swing arms 504 pivot about the first pivot 512 and the second pivot 520 to permit this movement. The swing arms 504 maintain their connection to the horizontally facing side 72 and the vehicle structure 84 during movement of the battery pack 14 relative to the vehicle structure 84.

As the battery pack 14 moves relative to the vehicle structure 84, the battery pack 14 is effectively moved vertically upward away from the trunk floor 68 of the trunk compartment 60. This moves the battery pack 14 out of the tire tub of the trunk compartment 60, which may be desirable.

In this example, a wedge 524 is secured to a surface of the electrified vehicle, here the trunk floor 68. When a load is applied in the direction D to the rear of the vehicle, the wedge 524 is driven forward toward the battery pack 14. Movement of the wedge 524 causes the battery pack 14 to contact and slide along a ramped surface 528 of the wedge 524. The wedge 524 helps to initiate the movement of the battery pack 14 the direction $D_R$ from the positions of FIGS. 19 and 20 to the positions of FIGS. 21 and 22.

Other examples may omit the wedge 524.

The exemplary traction battery securing assemblies described above are shown as being along horizontally facing sides of the battery pack and as being secured to those horizontally facing sides of the battery pack. In other examples, the traction battery securing assemblies could be along a side of the battery pack, but secured to, for example, a vertical top side of the battery pack, a vertical bottom side of the battery pack, or both.

The various securing assemblies could be used together or separately to provide a desired movement of the traction battery in response to a load applied to the rear of the electrified vehicle. For example, the securing assembly 500 with the swing arms 504 could be used together with the securing assembly 400 having the bracket 404 along the side 72 facing away from the rear of the electrified vehicle.

Features of the disclosed examples include a traction battery securing assembly that can support a traction battery during impact event while ensuring that the traction battery effectively stays connected to a vehicle structure.

It should be understood that terms such as "top," "bottom," "vertical," and "horizontal" are used in this disclosure with reference to the normal attitude of the battery pack and the vehicle. That is, horizontal is aligned with a ground surface and vertical is perpendicular to that ground surface. These terms have been used herein for the purposes of explanation and should not be considered otherwise limiting.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
   a battery pack of a vehicle; and
   a securing assembly that secures the battery pack to a structure of the vehicle, the securing assembly disposed along a horizontally facing side of the battery pack and configured to move from a first position to a second position in response to an impact load to permit movement of the battery pack relative to the structure of the vehicle, the impact load applied to an area of the vehicle that is spaced a distance from all portions of the battery pack, wherein the battery pack is electrically coupled to a powertrain of the vehicle when the securing assembly is in the first position, wherein the first position is different than the second position.

2. The traction battery assembly of claim 1, wherein the securing assembly comprises a rail and a groove slideably retained by the rail, wherein the groove slides relative to the rail when the securing assembly moves from the first to the second position.

3. The traction battery assembly of claim 2, wherein the battery pack has a plurality of sides extending vertically from a top of the battery pack to a bottom of the battery pack, wherein one of the rail or the groove is provided by one of the plurality of sides, and the other of the rail or the groove is secured directly to the vehicle structure.

4. The traction battery assembly of claim 1, wherein the battery pack is disposed above a trunk floor of the vehicle.

5. The traction battery assembly of claim 1, further comprising a frame, wherein the rail extends from one of the frame or the horizontally facing side of the battery pack, wherein the groove is provided by the other of the horizontally facing side of the battery pack.

6. The traction battery assembly of claim 5, further comprising at least one attachment that secures the frame to the battery pack, the at least one attachment configured to fracture to permit movement of the battery pack relative to the vehicle structure.

7. The traction battery assembly of claim 6, wherein the at least one attachment is configured to fracture in response to the load exceeding a threshold value.

8. The traction battery assembly of claim 5, further comprising a damper that damps movement of the groove relative to the rail.

9. The traction battery assembly of claim 8, wherein the damper is a spring having a first end portion secured to the battery pack and an opposite, second portion secured to the frame.

10. The traction battery assembly of claim 9, wherein the spring is configured to compress in response to the securing assembly moving from the first position to the second position.

11. The traction battery assembly of claim 8, wherein the damper is a fluid-based damper.

12. The traction battery assembly of claim 1, wherein the battery pack slides forward relative to a trunk floor of the vehicle when the securing assembly moves from the first position to the second position.

13. A traction battery securing method, comprising:
transitioning a securing assembly from a first position to a different second position in response to an impact load to permit movement of a battery pack relative to a vehicle structure of a vehicle, the securing assembly securing a horizontally facing side of the battery pack to the vehicle structure, the impact load applied directly to an area of the vehicle that is spaced a distance from all portions of the battery pack, wherein the battery pack is electrically coupled to a powertrain of the vehicle when the securing assembly is in the first position.

14. The traction battery securing method of claim 13, wherein the securing assembly comprises a rail and a groove slideably retained by the rail, wherein the transitioning comprises sliding the groove relative to the rail when the securing assembly moves from the first to the second position.

15. The traction battery securing method of claim 13, wherein at least one attachment secures a frame of the securing assembly to the battery pack to hold the battery pack in the first position, and further comprising fracturing the at least one attachment to permit movement of the battery pack relative to the vehicle structure from the first position to the second position.

16. The traction battery securing method of claim 13, further comprising damping movement of the battery pack from the first position to the second position using a damper.

17. The traction battery securing method of claim 16, wherein a first end of the damper is directly secured to a frame of the securing assembly and an opposite, second end of the damper is directly secured to the battery pack.

18. The traction battery securing method of claim 13, wherein, during the transitioning, the battery pack slides forward within the vehicle when the battery pack moves relative to the vehicle structure.

19. A traction battery assembly, comprising:
a battery pack of a vehicle;
a securing assembly that moves from a first position to a different, second position in response to an impact load to permit movement of the battery pack relative to the structure of the vehicle, the securing assembly securing the battery pack to a structure of the vehicle, the battery pack electrically coupled to a powertrain of the vehicle when the securing assembly is in the first position;
a rail and a groove of the securing assembly, the groove slideably retained by the rail, the groove sliding relative to the rail when the securing assembly moves from the first to the second position; and
a damper that damps movement of the groove relative to the rail.

20. The traction battery assembly of claim 19, further comprising at least one attachment secures a portion of the securing assembly to the battery pack to hold the battery pack in the first position, the at least one attachment configured to fracture to permit movement of the battery pack relative to the vehicle structure from the first position to the second position.

* * * * *